Patented Feb. 16, 1954

2,669,577

UNITED STATES PATENT OFFICE 2,669,577

N-ACYLOXYALKYL SUBSTITUTED DERIVATIVES OF AMINOALKOXYDIARYLMETHANES AND SALTS THEREOF

John W. Cusic, Skokie, Ill., assignor to G. D. Searle & Co., Chicago, Ill., a corporation of Illinois No Drawing. Application September 16, 1950, Serial No. 185,319

10 Claims. (Cl. 260—477)

This invention relates to esters of diarylmethyl ethers of amino alkanols wherein the amino group is substituted with an acyloxyalkyl radical, to salts of such compounds and to processes for preparing the same. More particularly my invention relates to compounds having the following general structural formula

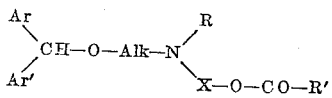

wherein Ar and Ar' are aromatic radicals, Alk is an alkylene radical, R is alkyl, hydrogen or an acyloxyalkyl radical of the formula

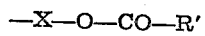

X is an alkylene radical and R' is a lower alkyl, lower carbalkoxyalkyl or lower aryl radical.

The present application is a continuation-in-part of my copending application Serial No. 791,456, filed December 12, 1947, now United States Patent No. 2,532,292, issued December 5, 1950.

It is an object of this invention to provide new chemical substances of the foregoing general formula which are useful in the medical and related arts. It is a further object of this invention to provide efficient manufacturing processes for such substances.

In the foregoing structural formula, the radicals Ar and Ar' are exemplified by aromatic hydrocarbon groups such as phenyl, tolyl, ethylphenyl, xylyl, naphthyl, xenyl and the like; by halogenated and alkoxylated aromatic hydrocarbon groups such as chlorophenyl, bromophenyl, anisyl and veratryl; and by heterocyclic radicals which are aromatic in character, including pyridyl, thienyl, pyrimidyl, thiazolyl and related radicals. Ar and Ar' can represent the same or different aromatic radicals.

The alkylene radicals, Alk and X, represent bivalent radicals derived from saturated hydrocarbons by the removal of hydrogen atoms from two different carbon atoms. They therefore include such radicals as ethylene, propylene, trimethylene, tetramethylene, 1,2-butylene, 2,3-butylene, 1,3-butylene, the amylenes and higher bivalent aliphatic radicals.

The radical R represents hydrogen and lower alkyl radicals containing 1 to 6 carbon atoms which may be straight or branched chained, including methyl, ethyl, propyl, isopropyl, butyl, isobutyl, amyl, secondary amyl, hexyl, and the like. R also represents acyloxyalkyl radicals such as β-acetoxyethyl, γ-acetoxypropyl, β-propionoxypropyl, β-butyroxyisopropyl, β,γ-diacetoxypropyl, δ-valeroxybutyl, γ-benzoxybutyl, β-(phenylacetoxy)amyl, and related radicals. The radical R' represents lower alkyl radicals of the foregoing type and lower aromatic carbocyclic radicals such as phenyl, tolyl, xylyl, chlorophenyl, bromophenyl, methoxyphenyl, ethoxyphenyl, and related aromatic monocarbocyclic radicals.

The compounds to which this invention relates are of use as therapeutic agents. They are in general antihistaminic, antiallergic and antispasmodic drugs. Certain of them have local anesthetic properties and some are of value in preventing anaphylaxis. The quaternary ammonium salts are surface active and have antiseptic qualities. The organic bases per se are of value as medicinal agents. These are high-boiling oils in general, and are soluble only in organic solvents.

In practice it is preferable to use these organic bases in the form of salts with non-toxic organic and inorganic acids, or as quaternary ammonium salts with reactive organic halides and esters. Among the acids which I have found of value for salt formation are hydrochloric, hydrobromic, hydriodic, sulfuric, phosphoric, tartaric, ascorbic, sulfamic, citric, acetic, lactic, maleic, malic, succinic, gluconic, benzoic, salicyclic and the like. Reactive esters and halides which are suitable for quaternary salt formation include the alkyl halides such as methyl chloride, methyl iodide, ethyl bromide, propyl bromide, butyl chloride and n-butyl bromide; aralkyl halides such as benzyl bromide, benzyl chloride, naphthylmethyl chloride, phenethyl bromide, anisyl and veratryl chlorides; hydroxyalkyl halides as, for example, ethylene bromohydrin, propylene chlorohydrin, glycerol monochlorohydrin and δ-bromobutanol; esters such as dimethyl sulfate, diethyl sulfate, methyl p-toluenesulfonate, propyl benzenesulfonate and the like. Salts can also be formed by the addition of acidic xanthine compounds of the type of 8-chlorotheophylline, 8-bromotheophylline and related 8-haloxanthines. The salts are free bases and are all useful substances; it is understood that in this application and appended claims reference to the bases is also meant to include acid addition and quaternary salts thereof.

The basic compounds which comprise my invention can be made by reacting a diarylmethyl haloalkyl ether of the formula

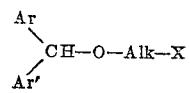

wherein Ar and Ar' represent aryl nuclei, Alk represents an alkylene chain and X represents a halogen, such as chlorine or bromine, with a primary or secondary amine of the type

wherein Z represents a hydroxyalkyl radical and Z' represents hydrogen, hydroxyalkyl or alkyl. During the reaction the elements of hydrogen halide, HX, are split out and the desired base is obtained. The diarylmethyl haloalkyl ether used as a starting material can be obtained by reacting in the presence of alkali a diarylmethyl chloride or bromide with an alkylene halohydrin of the formula HO—Alk—X, where X is chlorine or bromine.

The resulting hydroxy compound is then acylated with an acyl halide or anhydride derived from an organic acid of the formula

R'—COOH wherein R' has the meaning designated hereinabove. This reaction is carried out in an inert solvent which can be neutral or basic, such as a liquid hydrocarbon boiling in the range of 50–150° C., as for example in dry benzene, toluene, or xylene, or in a non-reactive basic solvent such as dry pyridine, quinoline, dimethylaniline, diethylaniline, and related solvents.

The complex organic bases are generally isolated by extraction with dilute aqueous acid whereby the acid addition salt is formed which is generally soluble in water and passes into the aqueous phase. The organic base is isolated from the latter by alkalinization and extraction with an organic solvent such as ether, benzene, carbon tetrachloride, and the like. If a basic non-reactive solvent is used as a reaction medium, the organic bases are preferably isolated from such solvents by evaporation of the solvent, solution of the residue in dilute mineral acid, alkalinization, extraction with a water-immiscible organic solvent and distillation.

My invention is further disclosed by the following examples which are provided for the purposes of illustration and which are in no way to be construed as limiting my invention in spirit or in scope. Relative quantities of materials are given in parts by weight and temperatures are recorded in degrees centigrade.

*Example 1*

285 parts of β-(methyl-β-hydroxyethylamino)-ethyl benzohydryl ether are dissolved in 105 parts of dry ether, and 78 parts of acetyl chloride are added gradually. After the addition the mixture is allowed to stand for one hour and then refluxed gently for one hour. Upon standing a solid precipitate of β-(methyl-β-acetoxyethylamino)-ethyl benzohydryl ether hydrochloride separates. This is removed and recrystallized from isopropanol diluted with ether. It forms hygroscopic needles which melt at 87–89° C. The base has the formula

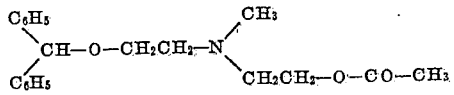

*Example 2*

By a similar process using 154 parts of phenylacetyl chloride, there is obtained β-(N-β-phenylacetoxy-ethyl-methyl-amino)ethyl benzohydryl ether, which distills at 252–258° C. at 2 mm. pressure. This base forms a non-crystalline tartrate which is readily soluble in water.

The corresponding benzoyl derivative is made in ether, using 145 parts of benzoyl chloride. It forms a crystalline hydrochloride.

*Example 3*

27 parts of β-(ethyl-β-hydroxyethylamino)-ethyl benzohydryl ether and 12 parts of acetyl chloride in 80 parts of dry toluene are refluxed for 15 hours. The solution is cooled and extracted with dilute hydrochloric acid. The acid extract is made alkaline and extracted with ether. The ether solution is dried and evaporated and the residue of β-(ethyl-β-acetoxyethylamino)ethyl benzohydryl ether distills at 197–199° C. at 2 mm. pressure. The hydrochloride is prepared by reacting an ether solution with an equivalent of absolute alcoholic hydrogen chloride. After recrystallization from ethyl acetate this salt melts at 93–94° C.

*Example 4*

427 parts of β-(methyl-β-hydroxyethylamino)-ethyl benzohydryl ether in 1000 parts of absolute ether are added slowly with good agitation to a solution of 329 parts of β-carbethoxypropionyl chloride in 1100 parts of absolute ether at 0° C. The oily precipitate which forms is isolated and distilled under reduced pressure. It boils at 242–244° C. at 2 mm. pressure and forms a non-crystalline hydrochloride and a non-crystalline citrate, both of which are readily soluble in water, forming 5% solutions which are suitable for medicinal use. The base has the formula

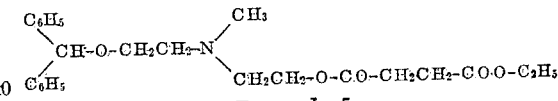

*Example 5*

A solution of 20 parts of the organic base obtained in Example 4 and 5 parts of methyl chloride in 60 parts of methyl ethyl ketone is heated at 60° C. for 15 hours in a closed vessel. The reaction mixture is chilled and the crystalline precipitate is removed and dried. The methochloride thus obtained melts at 123–124° C.

*Example 6*

510 parts of β-dimethylaminoethyl benzohydryl ether and 501 parts of β-bromoethyl acetate are heated in 400 parts of methyl ethyl ketone at 75–80° C. for two days in a closed vessel. The reaction mixture is chilled and diluted with anhydrous ether causing the formation of an oily precipitate of β-(dimethyl-β-acetoxyethylamino)-ethyl benzohydryl ether bromide. This precipitate is removed by decantation, dissolved in a mixture of isopropanol and ethyl acetate, chilled and diluted with anhydrous ether. The oily precipitate which forms soon crystallizes on standing. The product so obtained melts at 88–90° C.

I claim:

1. A member selected from the group consisting of esters of a diarylmethyl N-substituted aminoalkyl ether having the formula

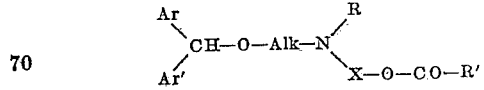

and addition salts on the amino group thereof, wherein Ar and Ar' are monocyclic aromatic radicals, Alk and X are lower alkylene radicals, R is a member selected from the group consisting of hydrogen and lower alkyl radicals, and R' is a member selected from the group consisting of lower alkyl, lower carbalkoxyalkyl, and monocyclic aromatic hydrocarbon radicals.

2. An ester of a diarylmethyl N-substituted aminoalkyl ether having the formula

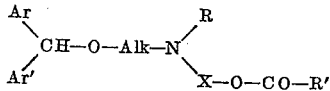

wherein Ar and Ar' are monocyclic aromatic radicals, Alk and X are lower alkylene radicals, and R and R' are lower alkyl radicals.

3. An ester of a benzohydryl N-substituted aminoalkyl ether having the formula

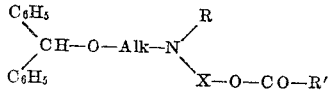

wherein Alk and X are lower alkylene radicals, and R and R' are lower alkyl radicals.

4. An ester of a benzohydryl N-substituted aminoalkyl ether having the formula

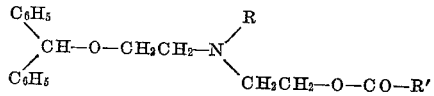

wherein R and R' are lower alkyl radicals.

5. β-(Methyl-β-acetoxyethylamino)ethyl benzohydryl ether, having the formula

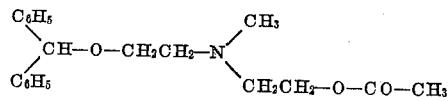

6. β - (Methyl - β - phenylacetoxyethylamino)ethyl benzohydryl ether, having the formula

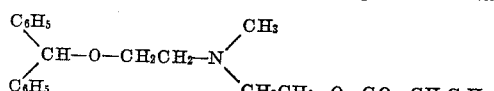

7. An ester of a diarylmethyl N-substituted aminoalkyl ether having the formula

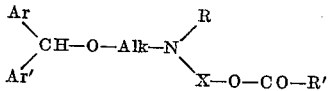

wherein Ar and Ar' are monocyclic aromatic radicals, Alk and X are lower alkylene radicals, R is a lower alkyl radical, and R' is a lower carbalkoxyalkyl radical.

8. An ester of a benzohydryl N-substituted aminoalkyl ether having the formula

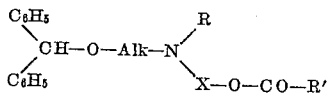

wherein Alk and X are lower alkylene radicals, R is a lower alkyl radical, and R' is a lower carbalkoxyalkyl radical.

9. An ester of a benzohydryl N-substituted aminoalkyl ether having the formula

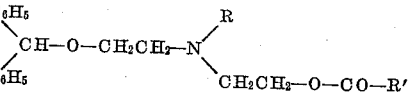

wherein R is a lower alkyl radical and R' is a lower carbalkoxyalkyl radical.

10. β - (Methyl - β - carbethoxymethylacetoxyethylamino)ethyl benzohydryl ether, having the formula

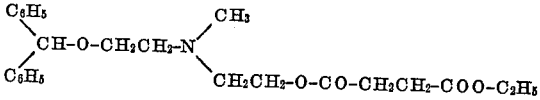

JOHN W. CUSIC.

References Cited in the file of this patent

UNITED STATES PATENTS

| Number | Name | Date |
|---|---|---|
| 2,532,292 | Cusic | Dec. 5, 1950 |